United States Patent [19]

Okayasu et al.

[11] 4,171,839
[45] Oct. 23, 1979

[54] BUFFER FOR A BUMPER

[75] Inventors: Hitoshi Okayasu, Gyoda; Sachio Nyui, Konosu, both of Japan

[73] Assignee: Showa Manufacturing Co., Ltd., Tokyo, Japan

[21] Appl. No.: 818,758

[22] Filed: Jul. 25, 1977

[51] Int. Cl.² ............................................. B60R 19/02
[52] U.S. Cl. ................................. 293/134; 267/139
[58] Field of Search ............... 293/60, 70, 71 R, 71 P, 293/84, 88, 89, DIG. 2; 267/64 R, 65 R, 116, 139; 188/269, 279, 280, 284, 311, 313, 314, 315, 317

[56] References Cited

U.S. PATENT DOCUMENTS

| 3,656,633 | 4/1972 | Ostwald | 267/65 R |
| 3,801,087 | 4/1974 | Akaike et al. | 293/DIG. 2 |
| 3,887,224 | 6/1975 | Browne | 267/116 |
| 3,920,274 | 11/1975 | Fannin | 293/70 |
| 4,029,304 | 6/1977 | Sakaguchi et al. | 267/116 |

Primary Examiner—Jesus D. Sotelo
Attorney, Agent, or Firm—A. W. Breiner

[57] ABSTRACT

A buffer for a bumper comprising an outer cylinder having its bottom closed and an inner cylinder fitted slidably into the outer cylinder and defined to be attached to the bumper at the tip thereof, a stopper being provided on the inner surface of the outer cylinder at the tip thereof for preventing the inner cylinder from being disconnected therefrom, an orifice and a check valve being provided at the heel of the inner cylinder for permitting exclusively to flow a fluid sealed in the outer cylinder to the inner cylinder therefrom, a free piston being provided in the inner cylinder for partitioning a gas sealed in the inner cylinder from the fluid sealed in the outer cylinder, and the fluid in the outer cylinder maintaining the gas under a compressed condition through the free piston at the heel of the inner cylinder, thereby allowing the free piston to displace in a damped speed to absorb the vibrations of an automobile attached with the bumper and to improve the stability of the automobile.

7 Claims, 3 Drawing Figures

BUFFER FOR A BUMPER

BACKGROUND OF THE INVENTION

1. Field of the Invention

The present invention relates to a buffer for a bumper for alleviating an impact due to collision of automobile equipped with the buffers or the like.

2. Description of the Prior Art

Conventional buffers are of such a type so as to be employed in combination with outer metallic springs. Such buffers are disadvantageous in that the assembled structure is complex and has a large size. In addition, it is possible to provide a spring characteristic by sealing a compressible fluid in the inner portion of a buffer, but in order to maintain constantly such a bumper under stabilized condition, a pressure must be applied to the fluid to keep it in a compressed condition. Hence such a conventional buffer has disadvantages in its complex structure and its difficulty of assembly.

SUMMARY OF THE INVENTION

It is a primary object of the invention to eliminate the aforesaid disadvantages and to provide a small-sized buffer for a bumper which can be manufactured conveniently.

DETAILED DESCRIPTION OF THE PREFERRED EMBODIMENTS

Figure 1:
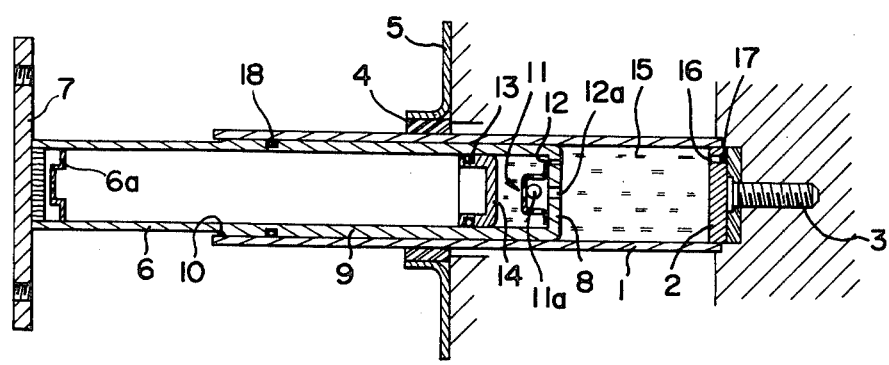
FIG. 1 is a cross sectional view taken along the longitudinal direction of an embodiment of a buffer for a bumper according to the invention.

FIG. 1 is a cross sectional view taken along the longitudinal direction of an embodiment of a buffer according to the invention in which a screw 3 is secured to a base 2 of an outer cylinder 1 having a bottom closure to secure the outer cylinder to a car body. The outer cylinder is also attached to the car body by means of a support plate 5 through a rubber cylinder 4 positioned near its center. An inner cylinder 6 is secured to a bumper through a bracket 7 fixed at the top thereof. A piston 9 is defined by the heel 8 and the central portion of the inner cylinder to be fitted slidably into the outer cylinder 1. A stopper of a snap ring 10 is attached to the inner surface of outer cylinder 1 at the vicinity of the top thereof to prevent inner cylinder 6 from disconnecting from the outer cylinder. A free piston 6a is provided at the tip of inner cylinder 6 in order to prevent any malfunction of the buffer by contamination of burrs out of the welded bracket 7 onto the top of inner cylinder 6. There is also provided a check valve 11 comprising a ball 11a and a central orifice 12a openable or closable by means of the ball 11a for passing exclusively a fluid from outer cylinder 1 to inner cylinder 6. As shown, ball 11a under static conditions will not close orifice 12a. A second orifice 12 connects inner cylinder 6 with outer cylinder 1 to generate a damping force on heel 8 of inner cylinder 6. A free piston 14 is also inserted into inner cylinder 6 through an O-ring 13 for separating the fluid from a gas sealed in inner cylinder 6.

Figure 2A:
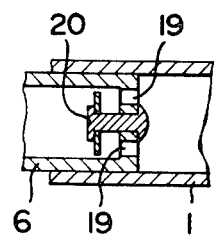
FIG. 2A is a cross sectional view taken along the longitudinal direction of another embodiment of a check valve.
Figure 2B:
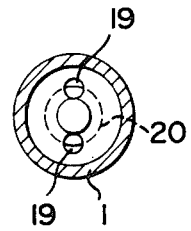
FIG. 2B is a side view of the check valve as shown in FIG. 2A.

The gas under a high pressure has been provisionally sealed within inner cylinder 6. The compressible fluid 15, for example, silicone oil or the like under some compressed condition has been forced into outer cylinder 1 to keep the high pressure gas under the compressed condition to such an extent that the bumper secured to a car body does not reciprocate during the travel of the car. For this purpose, after fluid 15 has been forced into outer cylinder 1 through, for example, a hole 16, the latter is sealed by means of a ball 17. Numeral 18 represents an O-ring. In place of such check valve 11 and orifice 12, such a purpose may be achieved by providing at least one orifice 19 closed by means of a valve 20 so as to remain a free portion of a predetermined area as shown in FIGS. 2A and 2B (in these figure, 2 orifices being shown).

As the buffer according to the invention has a structure as mentioned above, inner cylinder 6 attached to the bumper has been already biased by a force applied to the left direction in FIG. 1 under a normal condition in which the bumper is under the state of response, the bumper does not reciprocate and no noise is generated by vibration or the like during the travel of the car. When a larger impact is applied to the bumper by collision of the car, inner cylinder 6 is forced into outer cylinder 1 so that fluid 15 in outer cylinder 1 is passed into inner cylinder 6 through orifice 12 and central orifice 12a to compress the high pressure gas in inner cylinder 6 through free piston 14 and to be compressed also to absorb the impact energy. Immediately after the complete absorption of the impact energy, as ball 11a closes central orifice 12a, fluid 15 flows exclusively through orifice 12 to restore inner cylinder 6 to the original equilibrated position. Hence the inner cylinder returns to the original position at a slow speed so that the vibration of the car is absorbed thereafter to increase the stability.

As disclosed hereinbefore, the buffer according to the invention has a very simple and compact structure while safely protecting against impact.

What is claimed is:

1. A buffer for a bumper of a car body comprising an outer cylinder having a bottom closure at one end and an opening at the opposite end; an inner cylinder having a first end fitted slidably into said open end of said outer cylinder, said inner cylinder including a second end remote from said first end having means for attachment to a bumper and heel means at the end fitted into said outer cylinder, stopper means provided on the inner surface of said outer cylinder to prevent the inner cylinder from being disconnected from said outer cylinder, a free piston in said inner cylinder separating said inner cylinder into a first compartment and a second compartment; check valve means provided at the heel end of said inner cylinder and constructed and arranged with said heel means to permit fluid to flow from said outer cylinder to said second compartment of said inner cylinder; a gas under pressure sealed in the first compartment of said inner cylinder and a compressible fluid sealed in said outer cylinder and in communication through said check valve means with said second compartment of said inner cylinder, said compressible fluid maintaining said gas in said first compartment of said inner cylinder in a compressed condition, said check valve means including opening means which under substantially static conditions and upon substantial impact energy to the bumper of a car body permits substantially free flow of fluid from said outer cylinder to the second compartment of said inner cylinder and upon absorption of the impact energy closes a substantial portion of said opening means to permit only a limited flow which is substantially less than said free flow of compressible fluid between said outer cylinder and said second compartment of said inner cylinder until a static condition is again reached.

2. The buffer according to claim 1 wherein said check valve means includes a central orifice and a side orifice in the heel means of said inner cylinder, and a ball for closing said central orifice upon absorption of the impact energy.

3. The buffer according to claim 1 wherein said check valve means includes at least one orifice in the heel means of said inner cylinder and a valve constructed and arranged with said at least one orifice for closing a substantial portion of said orifice while leaving a part of said orifice open upon absorption of the impact energy.

4. The buffer according to claim 3 wherein said stopper means comprises a snap ring provided at the inner surface of said outer cylinder at the top end thereof.

5. The buffer according to claim 3 wherein said fluid comprises silicone oil.

6. The buffer according to claim 3 wherein said outer cylinder having a bottom closure is secured to a car body at the vicinity of its center portion through a rubber cylinder.

7. The buffer according to claim 3 wherein a free piston is provided at the bumper side of said inner cylinder for preventing invasion of any weld burr.

* * * * *